US008189225B1

(12) United States Patent  (10) Patent No.: US 8,189,225 B1
Lo et al.  (45) Date of Patent: May 29, 2012

(54) PRINTING TO A CLOUD PRINTER VIA NFC

(75) Inventors: Yung-Chieh Lo, Taipei (TW); Chinyue Chen, New Taipei (TW)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/253,026

(22) Filed: Oct. 4, 2011

(51) Int. Cl.
G06F 15/00 (2006.01)
G06F 15/16 (2006.01)

(52) U.S. Cl. ........................ 358/1.15; 709/229

(58) Field of Classification Search .............. 358/1.15
See application file for complete search history.

(56) References Cited

U.S. PATENT DOCUMENTS

| 2002/0035546 A1* | 3/2002 | Aoki | 705/52 |
| 2008/0220878 A1 | 9/2008 | Michaelis | |
| 2009/0033972 A1* | 2/2009 | Kato | 358/1.13 |
| 2010/0082567 A1 | 4/2010 | Rosenblatt et al. | |
| 2011/0235085 A1 | 9/2011 | Jazayeri et al. | |

OTHER PUBLICATIONS

"NFC Data Exchange Format (NDEF) Technical Specification", NFC Forum, Jul. 24, 2006, NDEF 1.0, NFCForum-TS-NDEF_1.0.
"NFC Record Type Definition (RTD) Technical Specification", NFC Forum, Jul. 24, 2006, RTD 1.0, NFCForum-TS-RTD_1.0.
"Text Record Type Definition Technical Specification", NFC Forum, Jul. 24, 2006, RTD-Text 1.0, NFCForum-TS-RTD_Text_1.0.
"URI Record Type Definition Technical Specification", NFC Forum, Jul. 24, 2006, RTD-URI 1.0, NFCForum-TS-RTD_URI_1.0.
"Near field communication", Wikipedia, the free encyclopedia, print date Nov. 22, 2011, pp. 1-22, retrieved from <http://en.wikipedia.org/wiki/Near_field_communication>.
"Information technology—Telecommunications and information exchange between systems—Near Field Communication—Interface and Protocol", International Standard, ISO/IEC 18092, Apr. 1, 2004, First Edition.

* cited by examiner

*Primary Examiner* — Saeid Ebrahimi Dehkordy
(74) *Attorney, Agent, or Firm* — McDermott Will & Emery LLP

(57) ABSTRACT

A system and machine-implemented method for sending a print request from a device to a cloud printer within a cloud, the cloud comprising the cloud printer and a cloud server. A network connection is established with the cloud server, and print data is transmitted from the device to the cloud server via the network connection. Print data location information is received from the cloud server via the network connection, the print data location information specifying an address of the print data in the cloud. An NFC connection is established with the cloud printer, and a print request is sent to the cloud printer via the NFC connection. The print request includes the print data location information and is configured to be used by the cloud printer to obtain the print data from the cloud.

25 Claims, 5 Drawing Sheets

PRINTING TO A CLOUD PRINTER VIA NFC

BACKGROUND

The subject disclosure generally relates to printing within a cloud, and, in particular, to sending a print request from a device to a cloud printer within a cloud.

In some cases, the user of an electronic device, such as a mobile phone, may wish to print from the electronic device to a printer. For example, the user of a mobile phone may take a photo with the mobile phone and desire to print that photo. Using conventional techniques, the user may be required to email the photo from the device to an email account, login to that email account from another device connected to a printer, download the photo from the email using the other device, and send a print request with the downloaded photo from the other device to the connected printer. This process can be inconvenient to the user.

Furthermore, the ability to print within a cloud computing environment is typically desirable. In this regard, cloud computing typically refers to the on-demand provision of computational resources (e.g., data, software) via a computer network, rather than from a local computer. Thus, a more convenient manner for printing from an electronic device within a cloud may be desirable.

SUMMARY

The disclosed subject matter provides for sending a print request from a device to a cloud printer within a cloud, the cloud comprising the cloud printer and a cloud server. A network connection is established between the device and the cloud server, and print data is transmitted from the device to the cloud server via the network connection. Print data location information is received by the device from the cloud server via the network connection, the print data location information specifying an address of the print data in the cloud. An NFC connection is established between the device and the cloud printer, and a print request is sent from the device to the cloud printer via the NFC connection. The print request includes the print data location information and is configured to be used by the cloud printer to obtain the print data from the cloud.

The disclosed subject matter relates to a machine-implemented method for sending a print request from a device to a cloud printer within a cloud, the cloud comprising the cloud printer and a cloud server. The method comprises establishing a network connection with the cloud server, and transmitting print data from the device to the cloud server via the network connection. The method further comprises receiving, in response to the transmitted print data, print data location information from the cloud server via the network connection, the print data location information specifying an address of the print data in the cloud. In addition, the method comprises establishing an NFC connection with the cloud printer, and sending a print request to the cloud printer via the NFC connection, the print request comprising the print data location information and being configured to be used by the cloud printer to obtain the print data from the cloud.

The disclosed subject matter also relates to a device for sending a print request from a device to a cloud printer within a cloud. The device comprises one or more processors, and a machine-readable medium comprising instructions stored therein, which when executed by the processors, cause the processors to perform operations comprising establishing an NFC connection with the cloud printer, and sending a print request to the cloud printer via the NFC connection, the print request comprising print data location information specifying an address of print data in the cloud, and the print request being configured to be used by the cloud printer to obtain the print data from the cloud.

The disclosed subject matter further relates to a machine-implemented method for printing from a cloud printer within a cloud, the cloud comprising the cloud printer and a cloud server. The method comprises establishing an NFC connection with a device, and receiving a print request from the device via the NFC connection, the print request comprising print data location information specifying an address of print data in the cloud. The method further comprises establishing a network connection with the cloud server, and sending a request for the print data to the cloud server via the network connection, the request comprising the print data location information received from the device, and the request being configured to be used by the cloud server to obtain the print data from the cloud. In addition, the method comprises receiving the print data from the cloud server via the network connection, and printing the received print data.

The disclosed subject matter further relates to a machine-implemented method for processing print data at a cloud server within a cloud, the cloud comprising the cloud server and a cloud printer. The method comprises establishing a first network connection with a device, receiving print data from the device via the first network connection, and storing the print data received from the device in the cloud. The method further comprises generating print data location information which specifies an address of the print data in the cloud, transmitting the print data location information to the device via the first network connection, and establishing a second network connection with the cloud printer. In addition, the method comprises receiving a request for the print data from the cloud printer via the second network connection, the request for print data comprising the print data location information, retrieving the print data from the cloud using the print data location information, and sending the print data to the cloud printer via the second network connection.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Figure 1:
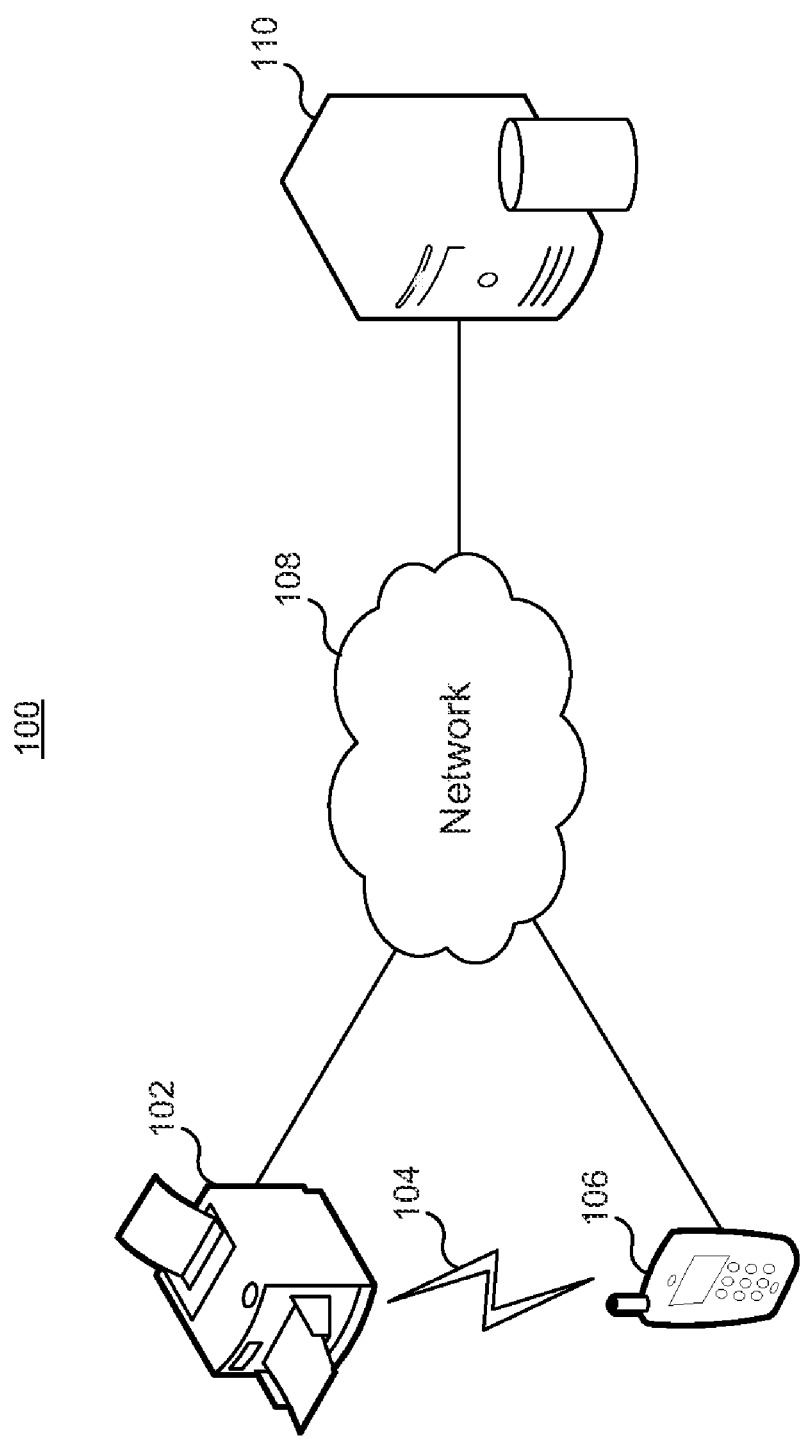
FIG. 1 is a depiction of a computing environment which provides for printing to a cloud printer via NFC.

FIG. 1 is a depiction of a computing environment which provides for printing to a cloud printer via NFC. Computing environment 100 can include a printer 102, an electronic device 106, and a server 110, all of which are in communication with each other via network 108.

Network 108 can correspond to a cloud network. In this regard, the term "cloud" or "cloud-aware" references the use of "cloud computing," which, generally speaking, includes a style of computing in which computing resources such as application programs and file storage are remotely provided over a network. Network 108 can include one or more networks, such as a local area network (LAN), a wide area network (WAN), an intranet, the Internet, or another type of network. Printer 102, electronic device 106 and server 110 can connect to network 104 via wired, wireless, optical, or other types of network connections.

Printer 102 can communicate with electronic device 106 through near field communication (NFC) connection 104. In other words, NFC connection 104 can enable near field communication between electronic device 106 and printer 102. In this regard, NFC is a short-range wireless communication technology. In NFC, a "reader" and "tag" typically exchange data only when they are within a specific distance of one another. NFC typically requires a distance of 4 cm or less. Thus, data communications typically terminate either by a command from an application using the NFC link, or when the communicating devices move out of range.

Electronic device 106 can be a laptop or desktop computer, a netbook, a tablet computer, a smartphone, a camera, or any device which may store or have access to data which a user may desire to print. In the example of FIG. 1, electronic device 106 is depicted as a handheld device. Printer 102 can be an electronic imaging device, and server 110 can be any computing system which can function as a server, such as a print server.

In the example of FIG. 1, electronic device 106 can receive a print request from a user of electronic device 106. Electronic device 106 can establish a network connection (via network 108) with server 110, and can transmit print data to server 110 via the network connection. Server 110 can store the print data in a cloud (e.g. within a cloud corresponding to network 108). Server 110 can generate print data location information (e.g., a URL) which specifies an address of the print data in the cloud (e.g., in a storage location in the cloud), and can transmit the print data location information to electronic device 106 via the network connection. Electronic device 106 can establish an NFC connection 104 with printer 102, and can send a print request to printer 102 via NFC connection 104, where the print request can include the print data location information. Printer 102 can establish a network connection (via network 108) with server 110, and can send a request for the print data to the cloud server using the network connection. The request for print data can include the print data location information received from electronic device 106. Server 110 can retrieve the print data from the cloud using the print data location information, and can transmit the print data to printer 102 via the network connection. Printer 102 can then print the received print data.

Figure 2:
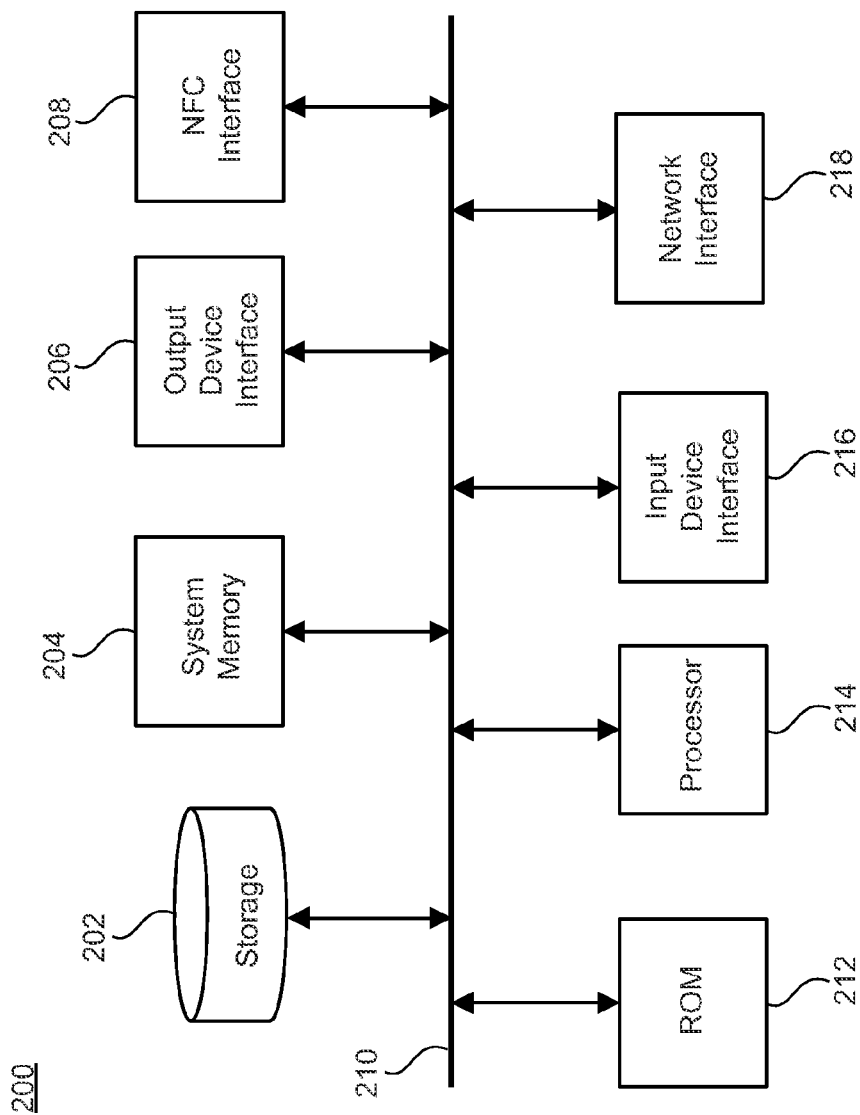
FIG. 2 conceptually illustrates an electronic system with which some implementations of the subject technology are implemented.

FIG. 2 conceptually illustrates the architecture of a system with which some implementations of the subject technology can be implemented. System 200 can correspond to the architecture of any of electronic device 106, printer 102 and server 110.

System 200 can be a computer, phone, personal digital assistant (PDA), or any other sort of electronic device. System 200 can include various types of computer readable media and interfaces for various other types of computer readable media. System 200 includes a bus 210, processing unit(s) 214, a system memory 204, a read-only memory (ROM) 212, a permanent storage device 202, an input device interface 216, an output device interface 206, an NFC interface 208, and a network interface 218.

Bus 210 collectively represents all system, peripheral, and chipset buses that communicatively connect the numerous internal devices of system 200. For instance, bus 210 communicatively connects processing unit(s) 214 with ROM 212, system memory 204, and permanent storage device 202.

From these various memory units, processing unit(s) 214 retrieves instructions to execute and data to process in order to execute the processes of the subject disclosure. Processing unit(s) 214 can be a single processor or a multi-core processor in different implementations.

ROM 212 stores static data and instructions that are needed by processing unit(s) 214 and other modules of system 200. Permanent storage device 202, on the other hand, is a read-and-write memory device. This device is a non-volatile memory unit that stores instructions and data even when system 200 is off. Some implementations of the subject disclosure use a mass-storage device (such as a magnetic or optical disk and its corresponding disk drive) as permanent storage device 202.

Other implementations use a removable storage device (such as a floppy disk, flash drive, and its corresponding disk drive) as permanent storage device 202. Like permanent storage device 202, system memory 204 is a read-and-write memory device. However, unlike storage device 202, system memory 204 is a volatile read-and-write memory, such a random access memory. System memory 204 stores some of the instructions and data that processing unit(s) 214 needs at runtime. In some implementations, the subject disclosure's processes are stored in system memory 204, permanent storage device 202, and/or read-only memory 212. For example, the various memory units include instructions for establishing an NFC link and for participating in NFC communication in accordance with some implementations. From these various memory units, processing unit(s) 214 retrieves instructions to execute and data to process in order to execute the processes of some implementations.

Bus 210 also connects to the input device interface 216 and output device interface 206. Input device interface 216 enables the user to communicate information and select commands to system 200. Input devices used with input device interface 216 include, for example, alphanumeric keyboards and pointing devices (also called "cursor control devices").

Output device interface 206 enables, for example, the display of images generated by system 200. Output devices used with output device interface 206 include, for example, printers and display devices, such as cathode ray tubes (CRT) or liquid crystal displays (LCD). Some implementations include devices such as a touch screen that functions as both input and output devices.

As shown in FIG. 2, it is possible for bus 210 to couple system 200 to a network (not shown) through a network interface 218. In this manner, system 200 can be a part of a network of computers (e.g., a LAN or WAN), an Intranet, or a network of networks, such as the Internet.

Certain implementations of system 200 may also include a near field communication (NFC) interface 208 allowing for close range communication. According to example embodiments, NFC interface 208 may comply with such standards as ISO 18092 or ISO 22421, and may have a range of approximately 2 to 4 cm. Of course, NFC interface 208 is not limited to these standards and ranges, and other interfaces allowing for close range communication can be used.

The close range communication with NFC interface 208 may take place via magnetic field induction, allowing NFC interface 208 to communicate with other NFC interfaces 208 or to retrieve information from tags having radio frequency identification (RFID) circuitry. As discussed below, NFC interface 208 may provide a manner for establishing an NFC link between different instances of system 200.

Figure 3:
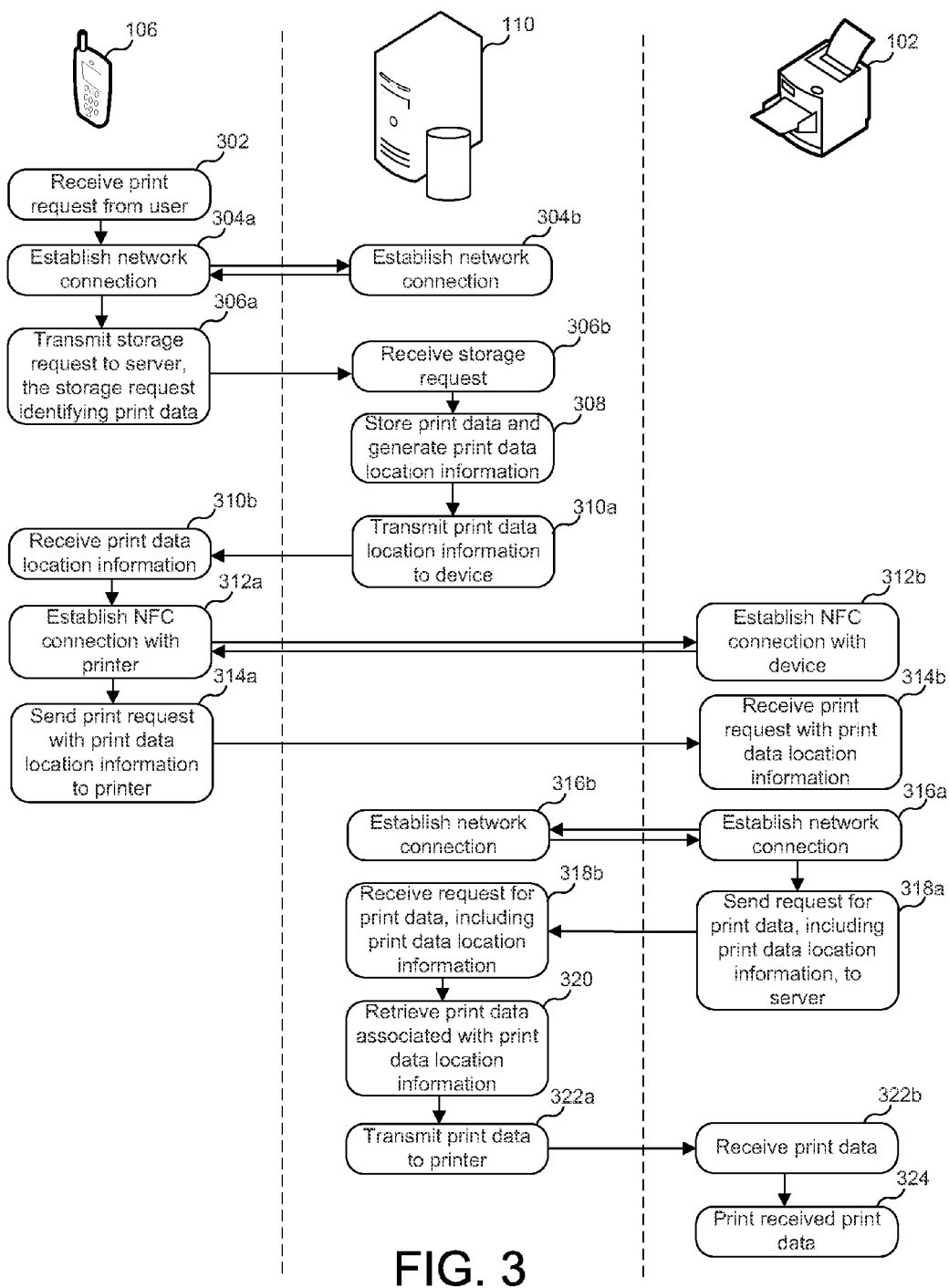
FIG. 3 illustrates a process by which a print request is sent from a device to a cloud printer within a cloud for printing by the cloud printer.

FIG. 3 illustrates a process by which a print request is sent from a device to a cloud printer within a cloud for printing by the cloud printer. It should be noted that although FIG. 3 depicts electronic device 106 as a handheld device, electronic device 106 may represent any embodiment of system 200. As described above, system 200 can be a computer, phone, personal digital assistant (PDA), or any other sort of electronic device. Furthermore, each of server 110 and printer 102 may also represent an embodiment of system 200. As such, electronic device 106 and printer 102 may each include an NFC interface 208, which can be used to engage in near field communication (NFC) with other NFC enabled devices. For example, NFC interface 208 may present a manner of establishing a communication link for data transfer between electronic device 106 and printer 102.

In step 302, electronic device 106 receives a print request from a user. The print request can be implicit or explicit. For an explicit request, the user of electronic device 106 can explicitly request printing, for example, via a print request dialog on electronic device 106. An example of an implicit request can correspond to electronic device 106 detecting printer 102 (e.g., via NFC). In such a case, it is possible that no confirmation dialog will appear on electronic device 106 to confirm printing, but a progress dialog may appear on electronic device 106 to show the status of a print job. It should be noted that if an NFC connection is established between electronic device 106 and printer 102, it is possible that this can serve as the establishment of an NFC connection in steps 312*a* and 312*b*, which is described in greater detail below. In steps 304*a* and 304*b*, a network connection is established between electronic device 106 and server 110. In steps 306*a* and 306*b*, electronic device 106 transmits a storage request identifying print data to server 110 via the established network connection.

The storage request can include the print data itself or identify a location of the print data. For example, the storage request can include print data such as a photo stored on electronic device 106. In another example, the print data can be associated with an application server within the cloud, and the storage request can identify the print data associated with the application server (e.g., as a URL).

In step 308, server 110 stores the print data in the cloud, and generates print data location information which specifies an address of the print data in the cloud. For example, the print data location information can be in the form of a URL. However, other formats for identifying the location of the print data can be used. In steps 310*a* and 310*b*, server 110 transmits the generated print data location information to electronic device 106 via the network connection. The network connection established in steps 304*a* and 304*b* can then be terminated (not shown).

In steps 312*a* and 312*b*, an NFC connection is established between electronic device 106 and printer 102. To establish the is connection, a user may position (hereinafter referred to as "tap") NFC interface 208 of electronic device 106 to be within a predetermined distance (e.g., between 2 to 4 cm) of NFC interface 208 of printer 102. Once the NFC connection has been established, printer 102 and electronic device 106 may communicate information between each other via the NFC connection.

Prior to the start of establishing the NFC connection, electronic device 106 may be in a "wake on NFC" mode. In this mode, NFC interface 208 of electronic device 106 may remain inactive until NFC interface 208 receives an NFC signal from another NFC interface 208. At the same time, NFC interface 208 of printer 102 may be in a host mode. In the host mode, NFC interface 208 of printer 102 may periodically emit NFC signals to seek out other nearby NFC interfaces 208.

The establishment of the NFC connection in step 304 may begin with an initiation handshake. The initiation handshake may start when a user taps NFC interface 208 of electronic device 106 to NFC interface 208 of printer 102. As mentioned above, while NFC interface 208 of printer 102 may be in a host mode, NFC interface 208 of printer 102 may periodically emit a ping message. NFC interface 208 of electronic device 106 may receive the ping message, causing NFC interface 208 of electronic device 106 to awake. Subsequently, NFC interface 208 of electronic device 106 may reply with an acknowledgement message, which may be received by NFC interface 208 of printer 102.

Printer 102 and electronic device 106 may exchange device profiles following the initiation handshake. The device profiles may include a variety of information regarding the capabilities of printer 102 and electronic device 106. Furthermore, electronic device 106 and printer 102 may authenticate one another, based at least in part on the previously-exchanged device profiles. In the device authentication, electronic device 106 or printer 102 may determine whether the other is trusted using any number of authentication schemes. The establishment of the NFC connection in steps 312*a* and 312*b* may be cancelled if either electronic device 106 or printer 102 fails to authenticate the other.

For example, electronic device 106 and printer 102 may rely on a private key known to both devices, which may have been exchanged prior to the establishment of the NFC connection in steps 312*a* and 312*b*. Alternatively, electronic device 106 and printer 102 may rely on a combination of a public key and a private key. Using this scheme, electronic device 106 and printer 102 may each exchange public keys associated with one another, or may obtain public keys from another source, such as a web service. Electronic device 106 and printer 102 may verify the public keys with a certificate authority (e.g., over the Internet). For example, the web service may represent a certificate authority. If there is any link broken in the chain of trust, establishment of the NFC connection may be terminated.

Following establishment of the NFC connection in step 304, electronic device 106 and printer 102 may remain in communication via the NFC connection to transfer additional information. Thus, in steps 314a and 314b, electronic device 106 sends a print request to printer 102 via the established NFC connection, the print request including the print data location information. The NFC connection established in steps 312a and 312b can then be terminated (not shown).

Before accepting the print data location information, it is possible for an authentication to be performed between printer 102 and electronic device 106. This authentication can be separate from authentication for establishing an NFC connection. In one aspect, printer 102 may determine if electronic device 106 is permitted to print. For example, color printing typically increases office operation cost, so color printing may be limited to the electronic devices of employees only. Of course, authentication is not limited to this example, and other forms of authentication between electronic device 106 and printer 102 can be performed.

In steps 316a and 316b, printer 102 establishes a network connection with server 110. In steps 318a and 318b, printer 102 sends a request for the print data to server 110 via the established network connection. The request for print data includes the print data location information received from electronic device 106 through NFC.

Before the request and print data location information is transferred from printer 102 to server 110, it is possible for authentication to be performed between printer 102 and server 110. In one aspect, to protect user data on server 110, when a user of electronic device 106 wants to print data from a cloud printer, the user may first be required to let server 110 know which cloud printer (e.g., printer 102) the user is operating on. For example, this information can be included in step 306a, so that server 110 knows which printer (e.g., printer 102) can access the user's data. As such, when printer 102 sends a request for print data in step 318a, server 110 can grant access if printer 102 matches that used by the user. Thus, even if the generated print data location information is compromised, the print data of the user can remain secure.

In step 320, server 110 retrieves the print data from the cloud using the print data location information. In steps 322a and 322b, server 110 transmits the print data to printer 102 via the network connection. Before doing so, server 110 may format the print data for printer 102. The network connection established in steps 316a and 316b can then be terminated (not shown). Printer 102 then prints the received print data in step 324.

Figure 4:
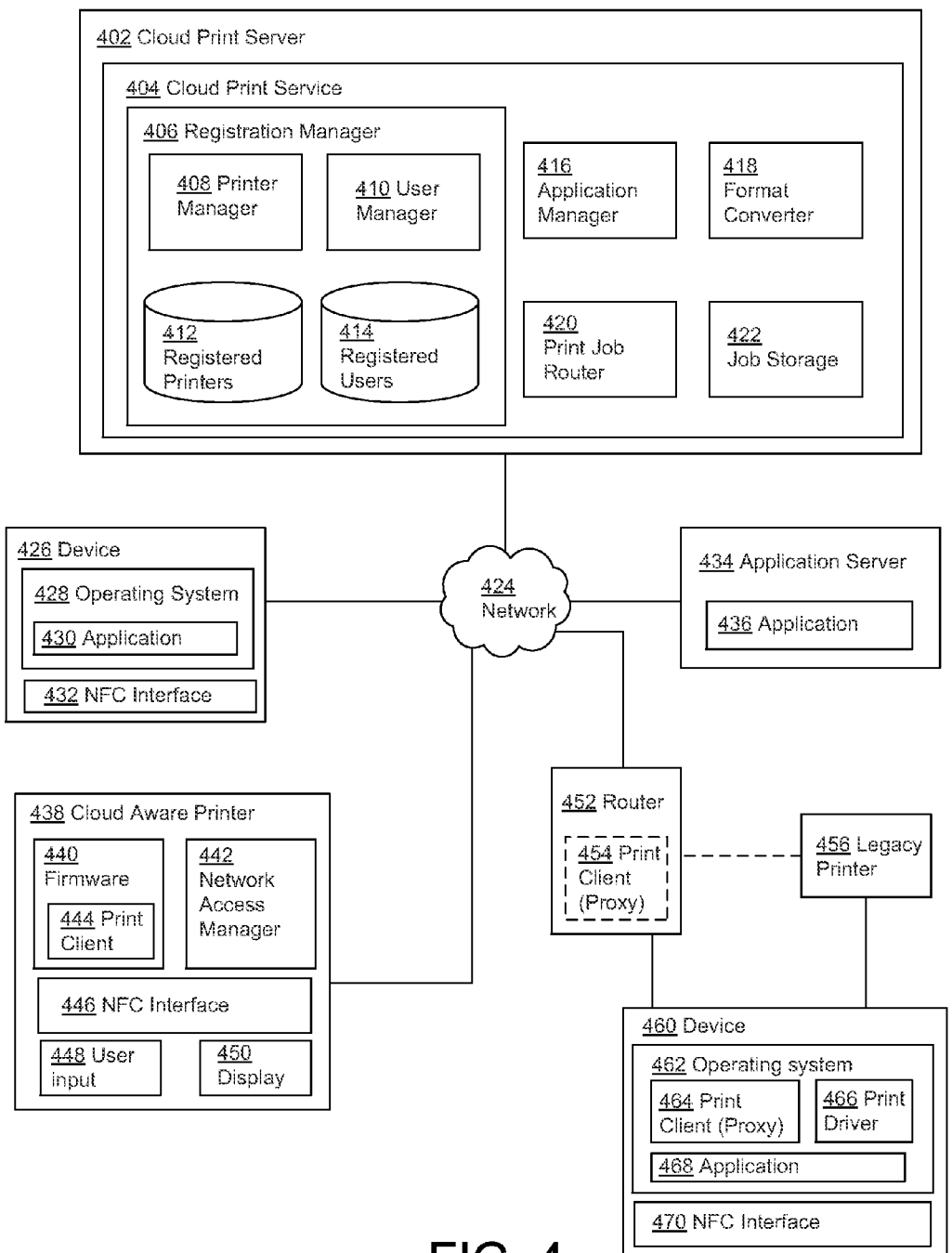
FIG. 4 is block diagram of a system for implementing a cloud print service.

FIG. 4 is block diagram of a system for implementing a cloud print service. In the example of FIG. 4, cloud print server 402 can correspond to server 110 of FIG. 1, device 426 can correspond to electronic device 106, cloud aware printer 438 and legacy printer 456 can correspond to printer 102, and network 424 can correspond to network 108.

In this regard, device 426 is illustrated as an example of virtually any computing device from which a user may wish to execute a print job. By way of nonlimiting example, then, device 426 may include a laptop or desktop computer, a netbook, a tablet computer, a smartphone, a camera, or any device which may store or have access to data which the user may desire to print.

Cloud print service 404 may be executed on cloud print server 402, which provides printing capabilities over network 424. As described in detail below, cloud print service 404 can therefore provide a user with a uniform printing experience which is platform-independent and which unburdens the user of the need to configure, update, or otherwise maintain or oversee printer operations. Various other features and advantages of cloud print service 404 are described in detail below, and/or would be apparent.

In the example of FIG. 4, an operating system 428 is illustrated as executing an application 430. Again, these elements are included by way of illustration and example, and may include virtually any operating system or other platform on which virtually any application may run. Operating system 428 may include a browser-based operating system.

Consequently, application 430 may include virtually any application which may run on any underlying operating system or platform. Examples of such applications are well-known and too numerous to mention in any detail, but generally include document processing applications, email applications, image editing or presentation software, a web browser, or virtually any application which provides the user with a rendering of data which the user may wish to print.

Application 430 may correspond to a local application which executes on device 426. Alternatively, application 430 may represent a web application which executes on a remote application server 434 as application 436. That is, application 436 may include any application functionality which is accessed by the user over network 424 and experienced locally as application 430, e.g., using a browser running at device 426. As is known, such web applications allow an owner of application server 434 to assume responsibility for installing, configuring, executing, and maintaining application 436 at application server 434, so that the user of device 426 may obtain the benefit of application 436 without many or any of the associated costs and responsibilities. Techniques for executing such a web application, and related technology, are well known in the art and are therefore not described further in detail herein, except as may be helpful or necessary to understand operations of system 400 of FIG. 4.

Network 424 may represent, for example, the Internet or other wide area public or private network. Network 424 may represent, in further examples, a corporate or other intranet, and/or a smaller-scale, local or personal network, any of which may be implemented using standard network technology.

Further in FIG. 4, a cloud-aware printer 438 is illustrated which is configured to communicate with cloud print service 404 over network 424. As noted above, cloud computing allows for computing resources such as application programs and file storage to be remotely provided over a network such as the Internet. For example, the computing resources can be provided through a web browser. Many web browsers are capable of running applications, which can themselves be application programming interfaces ("API's") to more sophisticated applications running on remote servers. In the cloud computing paradigm, a web browser interfaces with and controls an application program that is running on a remote server. Through the browser, the user can create, edit, save and delete files on the remote server via the remote application program. Thus, it may be observed that application server 434 and associated application 436 may also represent examples of cloud computing.

In the context of cloud-aware printer 438, cloud print service 404 enables application 430 to print directly to cloud-aware printer 438, without a requirement or need for (e.g., independently of), involvement of operating system 428. In other words, application 430 may communicate directly with cloud print service 404 to thereby print to cloud-aware printer 438, without e.g., requiring a local driver within operating system 428. As a result, virtually any application 430 that may be configured to communicate with the cloud print service 438 may make use of cloud-aware printer 438, as described in detail, below.

For example, cloud print service 404 may be configured to register the user and/or device 426, as well as cloud-aware printer 438. In a specific example, the device may be a smartphone, and the user may use application 430 to purchase a ticket (e.g., a movie ticket, or an airline ticket). Then, the user may print the purchased ticket directly to cloud-aware printer 438, even though device 426 and/or operating system 428 may not have the resources, or otherwise be configured, to support native printing in a conventional sense (e.g., may not currently be executing a print driver of any sort associated with cloud-aware printer 438). In this way, the user of application 430 may be provided with a print option and associated abilities that are not currently provided in conventional printing paradigms and techniques. Many other such examples are described herein, or would be apparent.

Cloud-aware printer 438 may be contrasted with a legacy printer 456, which does not natively support communication with cloud print service 404. Therefore, to illustrate additional or alternative examples of implementations of system 400 of FIG. 4, a separate device 460 is illustrated, which, as described below, may be modified to impart the advantages of cloud print service 404 to legacy printer 456. Similarly, a router 452 may additionally or alternatively be modified to thereby enable legacy printer 456 to participate in the cloud printing paradigm defined by the operations of cloud print service 404, as described in detail below.

In short, system 400 provides an ability for virtually any application running on any device within network 424 (e.g., applications 430, 436 and device 426) to communicate with cloud print service 404 to thereby print to any printer which is also in (direct or indirect) communication with cloud print service 404. Consequently, users may benefit from increased printing options and abilities, and experience an overall decrease in the costs and efforts associated with doing so. Meanwhile, printer manufacturers may experience a decreased or eliminated need to provide users with the (updated) driver(s) and other prerequisites for users to fully experience the benefits of their products. This may result in, for example, higher customer satisfaction, and a decreased cost of producing and maintaining printers.

In more detail, cloud print service 404 includes a registration manager 406, which may be configured to register printers and users. As shown, then, a printer manager 408 may be configured to receive a registration of cloud-aware printer 438 and/or legacy printer 456, including storing identification information therefore within a data store 412 of registered printers. Similarly, a user manager 410 may be configured to register a user(s) who may currently or potentially wish to execute print jobs using cloud print service 404, and to store identification information for such users within a data store 414 of registered users.

There are many example scenarios and techniques by which users and/or printers may come to be registered with cloud print service 404 through the registration manager 406. In general, for example, a user of device 426 may use a browser to visit a website associated with cloud print service 404, and may enter a username/password combination to establish a user account with the print service.

In other examples, such users already may have a user account with a separate and possibly related service or service provider. For example, various online services (e.g., other cloud-based computing resources) may provide functionality such as email, data storage, and document processing, and, in such cases, a user already may have a secure user account established in connection therewith. In such cases, cloud print service 404 may leverage or access such existing user accounts, e.g., to avoid a need to create a new user account, and to facilitate access of existing users of other services with the cloud print service.

Consequently, it may be appreciated that although user manager 410 and registered users data store 414 are illustrated as being within cloud print service 404, it also may occur that related functionality exists externally to the cloud print service, and is accessed thereby. For example, application server 434 may provide an email application as application 436, and a user of device 426 may be registered with this email application (service). In such a case, application server 434 may have the responsibility of maintaining the user's account, and cloud print service 404 may simply interface with application server 434 and provide access to the user once the user is logged into application 436.

Techniques for registering users, maintaining user accounts, and maintaining security of users' accounts, are well-known in the art, and are not necessarily described here in detail, except as may be necessary or helpful to understand operations of system 400, or related systems.

Meanwhile, printer manager 408, as referenced above, is responsible for registering cloud-aware printer 438, legacy printer 456, and/or any printer 10 which may interface with cloud print service 404 and which may currently or potentially be accessed by a user of the cloud print service.

An application manager 416 may be configured to communicate with any application which may be desired to be used for printing within system 400, including, e.g., application 430, and application 436. Thus, for example, application manager 416 may implement various application programming interfaces (APIs) which enable such communication with external applications.

In general, though, application manager 416 may include the functions of receiving a print request, and then receiving an actual print job, from, e.g., application 430. Receiving the print job may include receiving print data to be printed, along with print characteristics characterizing preferences and other aspects of how the print data is desired to be printed (e.g., color vs. black-and white, paper size, orientation, number of copies, or any other relevant or desired print characteristic). Application manager 416 may conduct other communications with application 430, as well, such as, e.g., providing a status of a printer or print job.

According to an example aspect, the first function of receiving a print request may include providing the user of application 430 (directly or indirectly) with a print dialog or other user interface with which the user may select an available/associated registered printer. Alternatively, designation of a printer can occur via NFC. In this regard, device 426, cloud aware printer 438 and device 460 can include NFC interfaces 426, 446 and 470, respectively. Each of NFC interfaces 426, 446 and 470 can correspond to NFC interface 208 of FIG. 2, and can be used to engage in NFC with other NFC enabled devices.

For example, NFC interfaces 432 and 446 may present a manner of establishing an NFC connection for data transfer between device 426 and cloud aware printer 438. Furthermore, the user of application 430 can request a print job and save the associated print data to the cloud. In saving the print job to the cloud, cloud print service 404 can store the print data in a storage location in the cloud, generate print data location information specifying the storage location, and provide the print data location information to device 426. As noted above, the print data location information can correspond to a URL or any other format for identifying the location of the print data. When the user is ready for the printout, he/she can establish an NFC connection by tapping device 426 with a printer (e.g., cloud aware printer 438, or device 460 for legacy printer 456), thereby designating that printer for printout. Once the NFC connection is established, device 426 can transfer the print data location information to the printer. The printer can in turn request receipt of the print data from cloud print service 404, using the print data location information. The printer can then receive the data from the cloud and begin printing.

By communicating the print data location information between device 426 and cloud aware printer 438 via NFC interfaces 432 and 446, respectively, it is possible to forego user selection of a printer from the list of available printers or to avoid displaying the list of printers altogether. In addition, the use of NFC to designate the printer can allow for queuing of multiple print jobs on the cloud. In particular, the user can send multiple print jobs to the cloud, and can tap device 426 with a printer when he/she is ready for all of the printouts.

Application manager 416 may communicate with application 430 (or other applications) in a format that is independent of a specific printer, e.g., that is generic with respect to all available or relevant printers within system 400. In this way, application 430 is relieved of some or all of the burdens associated with needing knowledge of a destination printer when formulating and/or sending the print job.

For example, application 430 may formulate both the print data and print characteristics in the same manner, regardless of whether the print job is destined for, e.g., cloud-aware printer 438 or legacy printer 456. In fact, even if the user of application 430 does not currently have any registered printer associated with his or her user account, the print job still may be forwarded to cloud print service 404 for storage, and later printed to whatever printer is ultimately registered with cloud print service 404 and the user's account. As noted above, the print job can also be printed to a printer by establishing an NFC connection between device 426 and the printer.

Consequently, application 430 may include or use, or be associated with, APIs to communicate with application manager 416, where such APIs may be light-weight, consistent, customizable, and easy to implement within or among various applications. Moreover, such APIs may rarely, if ever, need to be updated or maintained by the user in order for the user print from the application using cloud print service 404. Instead, such updates may be managed by an administrator or other provider of cloud print service 404 and/or by a provider of application 430, so that the user of application 430 is unburdened of associated efforts and responsibilities. Even as new printers are introduced into the marketplace over time, the user may have the experience that application 430 is able to utilize the new printer(s) simply by way of registration of the new printers with cloud print service 404.

Print jobs received at application manager 416 in the printer independent or generic format may be passed to a format converter 418, which may be configured to receive a print job from application manager 416 and facilitate or execute conversion of the print job into a format associated with the designated (type of) printer for the print job in question. Such conversion may thus generally include, as needed, conversion of the print data itself, as well as conversion of the print characteristics specified within a given print job. In a case where the printer is designated by establishing an NFC connection between device 426 and the printer, it is possible that format converter 418 may not receive and/or format the print job until the NFC connection has been established to designate the printer.

Furthermore, printers generally require low-level, device or type-specific instructions which provide a basis by which printers actually apply ink to paper to achieve a desired appearance. Such instructions therefore may include very specific portrayal of the desired print outcome, using, e.g., a Page Description Language (PDL). For example, the language PostScript may be used to describe a desired print outcome, and then rendered (e.g., rasterized) by a specific printer to generate printed text or images. Additionally, fixed-layout document formats exist which are designed to facilitate device-independent printing while maintaining document fidelity. For example, the portable document format (.pdf) is an example of such a format, where .pdf documents may be generated using PostScript. Somewhat similarly, the XML Paper Specification (XPS) provides such a fixed-layout document format, which is based on the eXtensible Markup Language (XML).

Print data may be received from application 430 in virtually any format, including, e.g., Hypertext Markup Language (HTML), or in a format associated with document processing and/or images (e.g., .jpeg), or in the PDF or XPS formats referenced above. Format converter 418 may thus be configured to receive print data in these and other various formats and convert the print data into a format that is recognizable by a designated printer.

Similarly, format converter 418 may be configured to convert the print characteristics associated with the print job into a format that is recognizable by the designated printer. That is, as referenced above, the print characteristics may include aspects of how the print data should or can be printed; i.e., based on preferences of the user and/or on capabilities (or lack thereof) of the designated printer(s). For example, legacy printer 456 may be a black-and-white printer with no two-sided printing abilities, while cloud-aware printer 438 may be a color printer with two-sided printing. Format converter 418 may then provide conversion, accordingly, depending on a selected printer.

Format converter 418 may provide and execute the resulting, converted print job using, e.g., a protocol referred to herein as a cloud print protocol (CPP). Thus, the cloud print protocol allows the cloud print service to communicate with cloud-aware printer 438 or legacy printer 456. Further detail and other aspects of the cloud print protocol are described in more detail, below.

The converted print job may be stored in a data store 422, illustrated as job store 422 in FIG. 4. Although illustrated separately in FIG. 4 for the sake of clarity and description, it may be appreciated that job store 422 may overlap or coincide with the data stores 412 and 414 of the registration manager 406. That is, for example, print jobs of a given user may be stored in conjunction with the user account of the user, and in conjunction with one or more printers registered to that user. As a result, print jobs may be committed to long-term storage, so that, for example, users may locate, identify, and re-print desired print jobs, even if the user later accesses cloud print service 404 from a different device than was used to originally send a given print job. In storing the print job (e.g., on job store 422), it is possible for cloud print service 404 to generate print data location information specifying the location of the print job, including the associated print data and characteristics of the print job.

Thus, it may be observed that conversion of the print job at least partially occurs at a separate device(s) (e.g., cloud print server 402, cloud-aware printer 438, device 460, or router 452) from the device(s) on which the originating application is executing (e.g., device 426, application server 434). In this way, for example, it is possible to formulate and submit a print job at least partially separately from a conversion of the print job into a printer-specific format, and to thereby divorce such conversion from an underlying operating system of the executing application.

A print job router 430 may be configured to route the converted print job to a designated printer. As noted above, the printer can be designated via a print dialog or via establishment of an NFC connection. Print job router 430 can further monitor and mediate execution and success/failure of the print job. Print job router 430 may thus be responsible for managing and monitoring on-going print jobs from a plurality of users which are designated for a corresponding plurality of printers, as described in detail, below.

In so doing, print job router 430 may be configured to execute, e.g., with a print client 444 executing on firmware 440 of cloud-aware printer 438. Print client 444 may communicate with cloud print service 404, e.g., with print job router 430 and/or the registration manager 406, using the cloud print protocol referenced above.

More specifically, print client 444 may be configured to register cloud-aware printer 438 with cloud print service 404, and to thereby associate the thus-registered printer 438 with a user of device 426. Moreover, print client 444 may be configured to actually drive cloud-aware printer 438 and thereby execute the desired printing.

In the example of FIG. 4, cloud-aware printer 438 is illustrated as including print client 444 within firmware 440. Firmware 440, as would be appreciated by one of skill in the art, may represent factory-installed hardware and/or software which provides designated functions without generally requiring or allowing user modification or configuration (e.g., may utilize read-only memory). Thus, cloud aware printer 438 may be pre-configured from before a time of purchase to communicate and coordinate with cloud print service 404, to thereby provide a convenient and enjoyable user experience.

For example, cloud aware printer 438 may include a network access manager 442, user input 448, and a display (or other user output) 450, which may generally represent conventional components that are not described here in detail except as needed to assist in understanding the operation of system 400. Of course, cloud-aware printer 438 also may include other conventional components, which are not discussed here for the sake or clarity and conciseness.

Network access manager 442 may represent associated hardware and/or software which enables cloud-aware printer 438 to communicate over network 424 with cloud print service 404. For example, such communication may be conducted wirelessly if cloud-aware printer 438 is within range of an appropriate wireless network. In other examples, network access manager 442 may enable a wired connection of cloud-aware printer 438 to network 424, e.g., by way of connection to a router such as router 452.

User input 448 may represent virtually any sort of keypad, stylus, or other techniques for entering data to cloud-aware printer 438. Similarly, display 450 may represent virtually any sort of audio and/or video display to output information to a user of cloud-aware printer 438.

In example scenarios, then, a user may purchase cloud-aware printer 438. Upon powering, cloud-aware printer 438 may automatically output or identify cloud print service 404, e.g., by printing a URL or other identifier on paper loaded in a paper tray of cloud-aware printer 438, or by displaying such information using display 450. Similarly, cloud-aware printer 438 may output registration information for itself, e.g., a serial number or other unique identifier.

Then, in one example scenario, the purchaser may use device 426 or other network device to communicate with cloud print service 404, e.g., by using a browser to visit a website of cloud print service 404 provided by cloud print server 402. The user/purchaser may then log into his or her user account associated with cloud print service 404 and be prompted to enter the registration information for cloud-aware printer 438.

In other example implementations, user input 448 and display 450 may similarly be used to communicate directly with cloud print service 404 using network access manager 442. For example, upon powering, cloud-aware printer 438 may automatically connect to cloud print service 404 using print client 444 and network access manager 442, and then use display 450 to prompt the user/purchaser to login to cloud print service 404, to thereby automatically associate cloud-aware printer 438 as being registered to the user/purchaser.

In contrast, legacy printer 456 may not be manufactured to include print client 444 and/or other components of cloud-aware printer 438. For example, legacy printer 456 may have been manufactured prior to an availability of cloud print service 404, or simply may have been made without the necessary components to communicate with cloud print service 404.

in such a case, legacy printer 456 may be connected in a conventional way to device 460 (e.g., by USB or other suitable wired or wireless connection). For example, device 460 may include an operating system 462, which may be used to host a print client 464 which is conceptually similar to print client 444, and which serves as a proxy for legacy printer 456 to thereby allow legacy printer 456 to participate in system 400.

In some implementations, print client/proxy 464 may communicate directly with legacy printer 456 to execute a print job from cloud print service 404. In other implementations, the operating system 462 may have a conventional printer driver 466 installed for legacy printer 456, in which case system 400 may leverage some or all of the functionality of the print driver 466 to drive legacy printer 456.

Thus, in operation, print client/proxy 464 may be configured to register legacy printer 456 with the registration manager 406 (printer manager 408) of cloud print service 404, in a similar manner(s) as described above and depending on a presence or absence of capabilities of legacy printer 456 (e.g., whether legacy printer 456 includes network access, user input and/or display components).

Once registered, an application 468 which may desire to print to legacy printer 456 may communicate a print job to cloud print service 404, e.g., in the manner described above with respect to application 430. As legacy printer 456 is thus incorporated and integrated into system 400, it may be appreciated that application 430 and/or application 436 may thus print to legacy printer 456, as easily as to cloud-aware printer 438. For example, a user of device 426 may use application 430 to execute a print job to legacy printer 456, even if legacy printer 456 is remote from device 426 over the network at the time of the printing.

Similarly, a print client 454 may be installed as a proxy component on router 452, as an addition or alternative to the print client 464, to integrate legacy printer 456 into system 400. The print client (proxy) 454 may thus similarly allow for registration of legacy printer 456 with cloud print service 404 and with one or more users (e.g., of device 426), and may accept print jobs from cloud print service 404 which are designated for legacy printer 456. For example, it is possible for a user of device 426 to establish an NFC connection with legacy printer 456 via NFC interface 470 of device 460, in order to designate legacy printer 456 as a printer for a particular print job.

Many features and advantages are provided by system 400 and variations thereof, as referenced herein and/or as would be apparent to one of skill in the art. For example, as described, system 400 facilitates remote printing in a straightforward and easily implementable fashion, because a user need only log in to cloud print service 404 and register a printer using any device (e.g., personal computer, smartphone or other mobile device, or a printer itself). Then, the user can thereafter login to cloud print service 404 from any device, anywhere on network 424, and send a print job to the thus-registered printer from any compatible application, even if the device and printer are remote from one another.

In other example implementations, it is possible to share printers between different users. For example, techniques currently exist for sharing documents in existing cloud-based document processing/management systems, such as when a first user sends an email to a second user with a link to a document to be shared. With system 400, such techniques and concepts can be extended to the realm of printing. For example, the first user may send a link referencing a printer to be shared (e.g., referencing or including registration information for the printer), so that the second, receiving user may simply follow the link to associate the identified printer with the second user's cloud print service user account. In these and other scenarios, users may, e.g., print documents directly to a receiving user, or print work documents to a home printer (or vice versa), and otherwise experience the benefits of remote printing.

Figure 5:
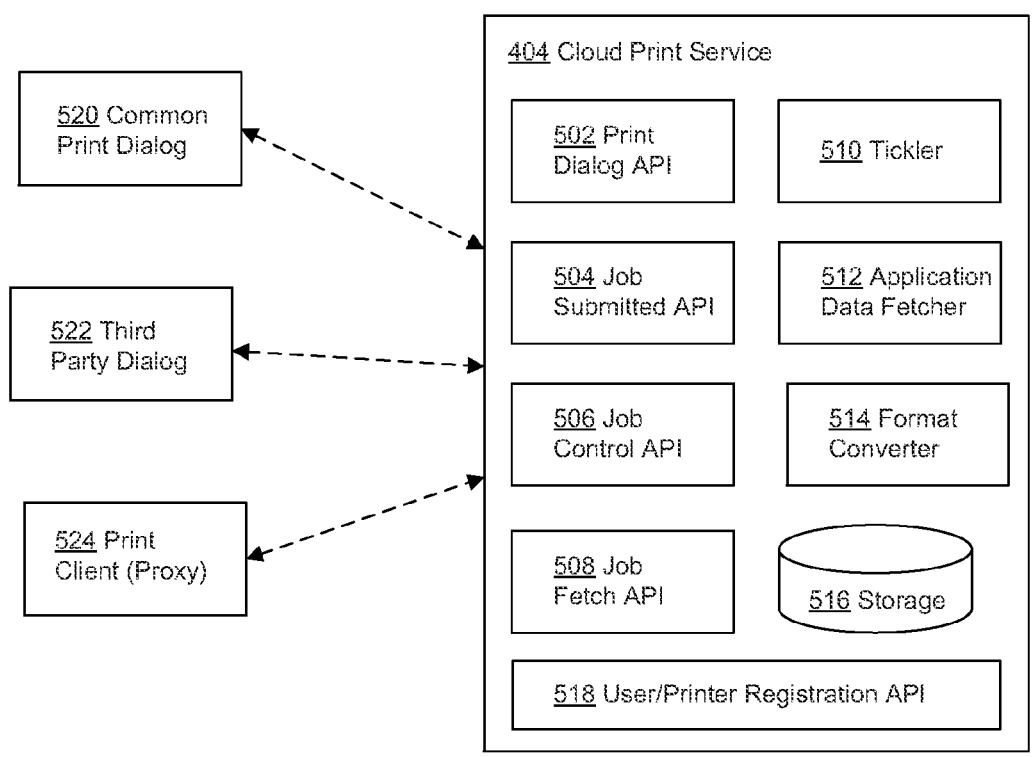
FIG. 5 is a block diagram illustrating a more detailed example of an implementation of a cloud print service of FIG. 4.

FIG. 5 is a block diagram illustrating a more detailed example of an implementation of a cloud print service of FIG. 5. More specifically, FIG. 5 illustrates specific APIs that may be used by the various components of cloud print service 404. As such, it may be appreciated that such APIs may individually be included in one or more of the various components of cloud print service 404 illustrated in FIG. 5, as would be apparent.

In the example of FIG. 5, cloud print service 404 is illustrated as including a print dialog API 502, which is in communication with a tickler 510. The tickler 510 may be operable to send notification(s) of new print jobs available for a given printer(s).

Then, upon authorization of a user by print dialog API 502, a list of printers, associated printer capabilities, and current jobs per printer and other status information may be provided to the application user, e.g., by way of a common print dialog 520, which may be rendered, e.g., using Javascript. Such a print dialog 520 may, in appearance, resemble conventional print dialogs, except as otherwise set forth herein (e.g., may allow for selection of an available printer and associated print features). In an example of a non-conventional aspect of the common print dialog 520, the common print dialog 520 may include a field(s) to allow a user to search and identify a previous/stored print job that is persistently stored by cloud print service 404. As noted above, the user can designate a printer for handling the print job by selecting a printer from a list of printers in print dialog 520, or by establishing an NFC connection with the desired printer.

Print dialog API 502 may thus provide (e.g., render) the common print dialog 520 essentially in its entirety for the application user, and thereby provide a common print dialog experience across applications interfacing with cloud print service 404. As also described, the print dialog API also may simply provide sufficient information for an application developer to construct a third party dialog 522, which may be different in appearance than the common print dialog 520, e.g., may have a proprietary appearance associated with a suite of applications provided by the developer/provider thereof. For example, third party dialog 522 may provide the appropriate interfaces for establishing an NFC connection with a printer, to designate the printer for printout.

Assuming authorization of the user proceeds, the user may then provide printer selection(s) and associated desired print characteristics, as well as the actual print data. The print data may be expressed in any conventional format, e.g., HTML, PDF, XPS, or an image format such as JPG, to name a few.

The print job may then be received at a job submit API 504, e.g., from either dialog 520 or 522. In some implementations, the print data may be included by reference to remote print data, e.g., by identification of an appropriate print data location information (e.g., a URL). The print data location information can specify the location of the print job in storage. Then, an application data fetcher 512 may be used to retrieve data to be printed.

Job submit API 504 may receive the print job in, to give a specific and non-limiting example(s), a hyper-text transfer protocol (HTTP) multi-part request which may include the printer capabilities expressed, e.g., in XPS, as well as a MIME type identifying the content type. Job submit API 504 may then provide the print job, including the print data and print characteristics, to a format converter 514. Format converter 514 operates essentially as described herein with respect to the format converter 418 of FIG. 4.

As noted above, in a case where the printer is designated by establishing an NFC connection between the device and the printer, it is possible that format converter 514 may not receive a print job until the NFC connection has been established to designate the printer. Furthermore, format converter 514 stores the print job, which can include the associated print data and characteristics of the print job, within storage 516. In storing the print job (e.g., on storage 516), it is possible for print data location information to be generated which specifies the location of the print job.

A print client 524, which may represent any of the print clients 444, 454 and 464 of FIG. 4, communicates with a job control API 506 and a job fetch API 508, to execute the print job. Specifically, the job fetch API 508 may provide the print job to the print client 524, e.g., may be used by print client 524 to fetch the next available job for the specified printer.

Job control API 506 may be responsible for authorizing print client 524 as needed, and for receiving updated status information from the printer in question, such as whether the print job has completed or failed. Such status information may also be stored within the storage 516 in associated with a corresponding print job. Job control API 506 may include status information including, e.g., whether a print job is currently queued and not yet downloaded to a corresponding print client 524, or spooled/downloaded and added to the client side native printer queue (if applicable).

In further examples of the print client as the print client proxy 464, it may occur that the proxy fetches print jobs in PDF format, along with the user-selected print characteristics represented as XML. Then, the proxy may use a PDF interpreted library to rasterize and print the PDF.

Finally in FIG. 5, a user/printer register API 518 is illustrated which is responsible for communicating with print client 524 to register the user(s) and all associated printers. Such registration information may be communicated using a HTTP multi-part request, and may include identification of the printer along with the printer capabilities (e.g., expressed in XPS), and may be stored in storage 516 with the various print jobs. Such registration processes and information may occur previously to actual print job executions, or interspersed therewith. In the latter case, for example, the user may seek to execute a print job only to find that all available printers are currently occupied, jammed, or offline. Nonetheless, it would be a simple matter for the user then to register a new printer with cloud print service 404 and proceed accordingly with the newly-registered printer to execute the desired print job.

Many other examples and variations of the systems and operations of FIGS. 1 to 5 would be apparent to one skilled in the art. For example, instead of printing to a hardware printer, the system(s) 200, 400 and 500 or similar systems may be used to print to PDF or other software format.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

in this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, hut need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration," Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A machine-implemented method for sending a print request from a device to a cloud printer within a cloud, the cloud comprising the cloud printer and a cloud server, the method comprising:
    establishing a network connection with the cloud server;
    transmitting print data, created on the device, from the device to the cloud server via the network connection;
    receiving from the cloud server via the network connection, in response to the transmitted print data created on the device, print data location information generated by the cloud server in response to storing the received print data in the cloud, the print data location information specifying an address of the received print data in the cloud;
    establishing an NFC connection with the cloud printer; and
    sending a print request to the cloud printer via the NFC connection, the print request comprising the print data location information and being configured to be used by the cloud printer to obtain the print data from the cloud.

2. The method of claim 1, further comprising:
    receiving a request to print from a user prior to the transmitting step.

3. The method of claim 1, wherein each of the device and the cloud printer comprises an NFC interface.

4. The method of claim 1, further comprising terminating at least one of the network connection and the NFC connection.

5. The method of claim 1, wherein the establishing the NFC connection step comprises:
    performing an initiation handshake with the cloud printer;
    exchanging device profile information with the cloud printer following the initiation handshake; and
    authenticating the cloud printer based on the exchanged device profile information.

6. The method of claim 1, wherein the print data location information is a URL.

7. The method of claim 1, wherein establishing the NFC connection designates the cloud printer for printing the print data without use of a print dialog.

8. The method of claim 1, wherein the print data corresponds to multiple print jobs, wherein the transmitting the print data queues the multiple print jobs on the cloud server, and wherein the establishing the NFC connection designates the cloud printer for printing the multiple print jobs without use of a print dialog.

9. The method of claim 1, further comprising performing authentication between the device and the cloud printer, to determine printing permissions of the device.

10. The method of claim 1, wherein the establishing the NFC connection with the cloud printer comprises:
    receiving, at an NFC interface of the device, a ping message from the cloud printer;
    providing, in response to receiving the ping message, for the NFC interface of the device to awaken; and
    establishing, in response to awakening the NFC interface, the NFC connection with the cloud printer via the NFC interface of the device.

11. The method of claim 10, wherein the performing authentication comprises:
    receiving a first identification of the cloud printer from the device via the first network connection;

determining a second identification of the cloud printer, in response to receiving the request for the print data from the cloud printer; and matching the first identification of the cloud printer with the second identification of the cloud printer, to authenticate the cloud printer with the cloud server.

12. A device for sending a print request from a device to a cloud printer within a cloud, the device comprising:

one or more processors;

a machine-readable medium comprising instructions stored therein, which when executed by the processors, cause the processors to perform operations comprising:

establishing a network connection with a cloud server;

transmitting print data, created on the device, from the device to the cloud server via the network connection;

receiving from the cloud server via the network connection, in response to the transmitted print data created on the device, print data location information generated by the cloud server in response to storing the received print data in the cloud, the print data location information specifying an address of the received print data in the cloud;

establishing an NFC connection with the cloud printer; and sending a print request to the cloud printer via the NFC connection, the print request comprising print data location information and being configured to be used by the cloud printer to obtain the print data from the cloud.

13. The device of claim 12, the operations further comprising:

receiving a request to print from a user prior to the transmitting operation.

14. The device of claim 12, wherein the establishing the NFC connection operation comprises:

performing an initiation handshake with the cloud printer;

exchanging device profile information with the cloud printer following the initiation handshake; and authenticating the cloud printer based on the exchanged device profile information.

15. The device of claim 12, wherein the print data location information is a URL.

16. A machine-implemented method for printing from a cloud printer within a cloud, the cloud comprising the cloud printer and a cloud server, the method comprising:

establishing an NFC connection with a device;

receiving a print request from the device via the NFC connection, the print request comprising print data location information generated by the cloud server in response to storing print data created on the device in the cloud, the print data location information specifying an address of the print data stored in the cloud;

establishing a network connection with the cloud server;

sending a request for the print data created on the device to the cloud server via the network connection, the request comprising the print data location information generated by the cloud server and received from the device, and the request being configured to be used by the cloud server to obtain the print data from the cloud;

receiving, in response to the sent request, the print data from the cloud server via the network connection; and printing the received print data.

17. The method of claim 16, wherein the device and the cloud printer each comprise an NFC interface.

18. The method of claim 16, further comprising terminating at least one of the network connection and the NFC connection.

19. The method of claim 16, wherein the establishing the NFC connection step comprises:

performing an initiation handshake with the device;

exchanging device profile information with the device following the initiation handshake; and authenticating the device based on the exchanged device profile information.

20. The method of claim 16, wherein the print data location information is a URL.

21. A machine-implemented method for processing print data at a cloud server within a cloud, the cloud comprising the cloud server and a cloud printer, the method comprising:

establishing a first network connection with a device;

receiving print data, created on the device, from the device via the first network connection;

storing the print data created on the device and received from the device in the cloud;

generating, in response to storing the received print data in the cloud, print data location information which specifies an address of the received print data in the cloud;

transmitting the print data location information to the device via the first network connection;

establishing a second network connection with the cloud printer;

receiving a request for the print data from the cloud printer via the second network connection, the request for print data comprising the print data location information;

retrieving the print data from the cloud using the print data location information; and sending the print data to the cloud printer via the second network connection.

22. The method of claim 21, wherein each of the device and the cloud printer comprises an NFC interface.

23. The method of claim 21, further comprising terminating at least one of the first network connection and the second network connection.

24. The method of claim 21, further comprising:

formatting the print data for the cloud printer prior to the sending step.

25. The method of claim 21, further comprising performing authentication between the cloud printer and the cloud server.

* * * * *